United States Patent [19]
Labinsky et al.

[11] Patent Number: 5,798,999
[45] Date of Patent: Aug. 25, 1998

[54] DAMPED TURNTABLE/DISK ARCULATELY POSITIONABLE RELATIVE TO A HEAD

[75] Inventors: Alexander Numa Labinsky, deceased, late of Monmouth, M. A. Reynolds, representative; Gerald Alfred John Reynolds, Monmouth; Jonathan Halliday, Gwent, all of Great Britain

[73] Assignee: Nimbus Communications International Limited, Gwent, United Kingdom

[21] Appl. No.: 718,694

[22] Filed: Sep. 27, 1996

Related U.S. Application Data

[63] Continuation of Ser. No. 256,013, filed as PCT/GB92/02370 Dec. 21, 1992, abandoned.

[30] Foreign Application Priority Data

Dec. 23, 1991 [GB] United Kingdom ............... 9127573
Dec. 23, 1991 [GB] United Kingdom ............... 9127574

[51] Int. Cl.$^6$ .................. G11B 25/04; G11B 19/20; G11B 17/34
[52] U.S. Cl. .................. 369/266; 369/248; 369/263; 360/99.09
[58] Field of Search ............. 369/266, 247, 369/248, 263; 346/137; 360/98.06, 99.03, 99.07, 99.09, 99.12

[56] References Cited

U.S. PATENT DOCUMENTS

| | | | |
|---|---|---|---|
| 3,637,161 | 1/1972 | Baur et al. ................ | 242/186 |
| 3,763,863 | 10/1973 | Mesek et al. ............. | 128/287 |
| 4,087,095 | 5/1978 | Koda ....................... | 369/266 |
| 4,120,504 | 10/1978 | Brecht ..................... | 274/23 A |
| 4,121,837 | 10/1978 | Towinari et al. .......... | 369/247 |
| 4,131,284 | 12/1978 | Rangabe .................. | 369/248 |
| 4,132,414 | 1/1979 | Dinsdale .................. | 369/266 |
| 4,154,445 | 5/1979 | Joannou .................. | 369/248 |
| 4,394,667 | 7/1983 | Cheng et al. ............. | 346/137 |
| 4,586,593 | 5/1986 | Danelson et al. ......... | 192/67 R |
| 4,680,746 | 7/1987 | Senso ...................... | 369/111 |
| 4,922,478 | 5/1990 | Verhagen ................. | 369/247 |
| 4,985,884 | 1/1991 | Watanabe et al. ........ | 369/263 |
| 5,193,084 | 3/1993 | Christiaens .............. | 369/266 |

FOREIGN PATENT DOCUMENTS

| | | |
|---|---|---|
| 013 903 | 8/1980 | European Pat. Off. . |
| 0 065 625 | 12/1982 | European Pat. Off. . |
| 0 074 131 | 3/1983 | European Pat. Off. . |
| 0 090 604 | 10/1983 | European Pat. Off. . |

(List continued on next page.)

OTHER PUBLICATIONS

Patent Abstract of Japan, vol. 6, No. 51 (P-108)(929) 6 Apr. 1982 & JP,A,56 165 955 (Rocoh K.K.) 19, Dec. 1981.
Patent Abstract of Japan, vol. 9, No. 329 (P-416)(2052) 24 Dec. 1985 & JP.a.60 154 356 (Hitachi Seisakusho K.K.) 14 Aug. 1985.

*Primary Examiner*—Stuart S. Levy
*Assistant Examiner*—David L. Ometz
*Attorney, Agent, or Firm*—Larson & Taylor

[57] ABSTRACT

A disk recording system for disks such as videodisks or compact disks has a turntable on which the disk is supported adjacent a recording head. A shaft defining the axis of rotation of the turntable rotates in a bearing and that bearing is itself movable about an axis defined by another shaft. The bearing of the shaft is an air bearing and there is a damper unit for damping that movement. There may be a sensor for detecting the rate of rotation of the shaft defining the axis of rotation of the turntable. The radial displacement of the head relative to the axis of the turntable may be determined on the basis of rotation of the other shaft, and the rotation of the turntable controlled on the basis of the product of signals representing the radial displacement and the rate of rotation of the shaft, respectively.

7 Claims, 11 Drawing Sheets

FOREIGN PATENT DOCUMENTS

| | | |
|---|---|---|
| 2 222 718 | 10/1974 | France . |
| 2222718 | 10/1974 | France . |
| 58-19703 | 2/1983 | Japan ................................. 369/248 |
| 58-194148 | 11/1983 | Japan ................................. 369/248 |
| 60-179521 | 9/1985 | Japan . |
| 2-248798 | 10/1990 | Japan . |
| 425 283 | 3/1935 | United Kingdom . |
| 718 388 | 11/1954 | United Kingdom . |
| 871713 | 7/1960 | United Kingdom . |
| 968 834 | 9/1964 | United Kingdom . |
| 1 045 020 | 10/1966 | United Kingdom . |
| 1 138 697 | 1/1969 | United Kingdom . |
| 1 248 133 | 9/1971 | United Kingdom . |
| 1 363 268 | 8/1974 | United Kingdom . |
| 1 363 269 | 8/1974 | United Kingdom . |
| 1 373 868 | 11/1974 | United Kingdom . |
| 1 523 340 | 8/1978 | United Kingdom . |
| 1 523 943 | 9/1978 | United Kingdom . |
| 2 012 467 | 7/1979 | United Kingdom . |
| 2 118 720 | 11/1983 | United Kingdom . |
| 2 133 889 | 8/1984 | United Kingdom . |
| 2 139 359 | 11/1984 | United Kingdom . |
| 2 176 013 | 12/1986 | United Kingdom . |
| 81/00614 | 3/1981 | WIPO . |

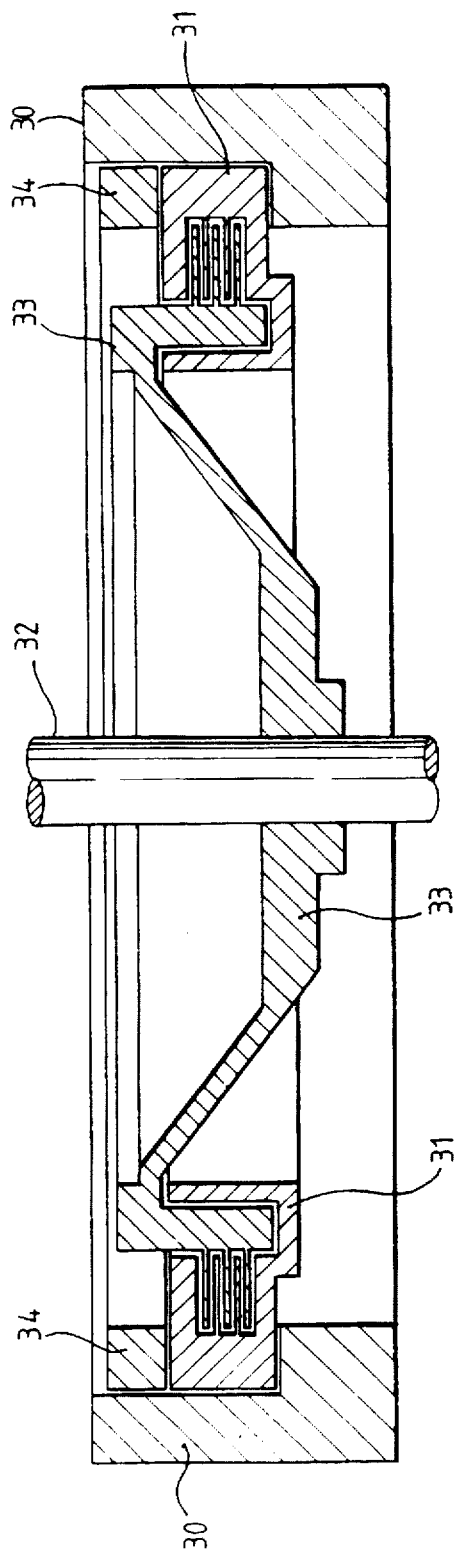
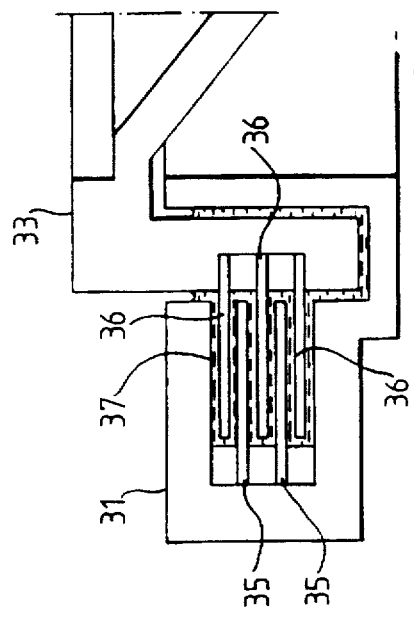
FIG.3a.
FIG.3b.

5,798,999

1

DAMPED TURNTABLE/DISK ARCULATELY POSITIONABLE RELATIVE TO A HEAD

This is a continuation of application Ser. No. 08/256,013, filed as PCT/GB92/02370 Dec. 21, 1992, now abandoned.

BACKGROUND OF THE INVENTION

1. Field of the Invention

The present invention relates to a disk recording system, for recording a disk such as a compact disk. The present invention also relates to a method of controlling the rotation of a turntable relative to a recording head in a disk recording system.

2. Summary of the Prior Art

Many systems as known in which information is recorded on a disk-shaped medium and may subsequently be played back. Generally the information is arranged either in substantially circular rings or in a continuous spiral track on the disk. An example of the former arrangement is the magnetic floppy disk or hard disk, where the information is divided into sectors lying in concentric tracks. Examples of the latter arrangement include the conventional gramophone record carrying sound information in analog form in the spiral groove in its surface, the optically read videodisk carrying video information in analog form in a series of pits arranged spirally on the surface (or on an interfacial boundary) of the disk, and the compact optical disk carrying audio or other information in digital form in a series of spirally-arranged pits. The gramophone record, the videodisk and the compact disk are all examples of media available to the consumer which cannot normally be recorded on by the consumer; recording takes place on a master disk which is subsequently replicated by various processes such that the disks bought by the consumer are close copies of the geometry and the information content of the master disk.

The process of recording information on any of these media usually shares in common the fact that the disk or master disk is rotated at a speed typically anywhere between 16⅔ r.p.m. (for some gramophone records) and 1,800 r.p.m. (or even higher for some videodisks) while the point of recording (which may be a magnetic head, a mechanical stylus, or a focused light beam) is traversed between the inside and outer edge of the disk at a slower rate. Normally it is a requirement of the recording system that the rotational motion of the disk may vary only slowly, if at all; generally this is easily ensured by the inertia of the disk itself, together with that of the mechanism which rotates it. The radial motion of the point of recording on the disk is, however, not so easily controlled. In the case of magnetic disk recording, it is usual that the recording head must move in discrete steps between the separate concentric tracks; by contrast, in the cases of gramophone records, videodisks, or compact disks, the recording head must move continuously relative to the disk in a generally radial direction in order to lay out the information in a spiral track, and it is characteristic of these cases that the smoothness of the radial motion is more important than the absolute accuracy of radial positioning. With a gramophone record, for example, any radial motion having significant energy in the audio frequency band, even if it represents only a small fraction of the average groove spacing, will appear as a corresponding lateral movement of the pickup when the final record copy is played, and this will be audible as a noise superimposed on the recorded audio signal. With videodisks and compact disks there is not only the possibility that any sudden radial motions of the recording head will cause the player to fail to follow the track on the final disk, but also the more serious likelihood that such motions will be dangerous simply because they will result in significant changes in spacing between successive turns of the spiral track. Since this spacing is typically only 1.6–1.7 μm, and any reduction in spacing has the effect of increasing the crosstalk between tracks (resulting in interference in the picture from a videodisk, or an increased likelihood of bit errors with a compact disk) it is desirable to maintain a tolerance of at most ±0.1 μm in the track spacing, and preferably a much closer tolerance than this.

To obtain the necessary radial tracking motion, it is usual to move the recording head along a straight line which passes through the axis of the disk, in other words radially. When recording gramophone record masters this is commonly achieved by mounting the recording head on a linear slide or rolling mount and moving it by means of a rotating leadscrew and nut. Satisfactory performance is achieved by careful engineering; the stiffness of the leadscrew drive is great enough to overcome residual friction in the mounting. In videodisk and compact disk mastering (recording) a similar technique may be used, in which the optics which produce the focused beam are moved over the rotating master disk. To avoid the disadvantage that part of the optics are thus movable while the remainder (owing to the size of the light source, normally a laser) have to be fixed, it is alternatively possible to move the entire turntable (which carries the master disk) together with its rotary bearing along a straight line, using a leadscrew, while the recording head remains fixed.

In long-playing optical videodisks, or optical compact disks used for audio or other data in digital form, a constant linear velocity mode or recording is normally used because it allows the maximum recording time consistent with operation at the optimum linear velocity (which determines the bandwidth of the signal which can be recorded) throughout the recording.

Constant linear velocity recording, however, adds complications to the system, because neither the speed of rotation of the disk, nor the speed of radial motion of the recording or playback head relative to the disk is constant. In a playback-only system this may be no great problem because both rotational and radial motions are normally controlled by servos governed by the information already laid down on the disk. Record/playback systems (for example read/write data recording systems) using pre-grooved disks are also simply implemented by servos of this type. However, in the case of a master recording system for videodisk or compact disk, where the master disk is initially devoid of groove structure, there is a problem in generating the required motions as it were from first principles.

If information is to be recorded in a spiral track of pitch P at a linear velocity v then, if the instantaneous radius is R and the rotational speed is ω (radians/sec.) at time t, $$\omega = \frac{v}{R} \qquad \text{Equation 1}$$

and $$\frac{dR}{dt} = \frac{P\omega}{2\pi} \qquad \text{Equation 2}$$

from which $\frac{dR}{dt} = \frac{Pv}{2\pi R}$ Equation 3

EP-A-011495 discloses, in the context of defining or following a plurality of substantially circular and concentric information tracks, an arrangement in which the relationship of Equation 1 is obtained by generating a signal dependent on the radius R, and generating therefrom an alternating current signal of frequency inversely proportional to the radius R. The angular rotational speed ω of the turntable is then synchronised to that alternating current signal. The same alternating current signal is used to control the radial velocity $dR/dt$, in accordance with Equation 2 using a lead screw drive. A similar method is described in EP-A-011493, in which an alternating current signal with a frequency inversely proportional to the radius R is generated, in this case by a digital division process.

It may be noted that the methods disclosed in EP-A-011495 and EP-A-011493 both require that an alternating current signal is generated first, to which the turntable rotation has to be synchronised.

SUMMARY OF THE PRESENT INVENTION

As discussed above, it is possible for either the recording head or the turntable bearing to be made the moving element. However, whichever is the moving element, a lead screw drive system is not completely satisfactory in videodisk or compact disk mastering because of the great smoothness of motion required. A very precisely ground lead screw would be needed, and sticking or slipping of the lead screw mechanism could cause significant problems.

If a drive mechanism other than a lead screw is employed, generally it will be less stiff than a lead screw. The smoothness of the radial tracking motion is then strongly dependent on the attainment of very low friction in the bearing on which the recording head or (as the case may be) the turntable bearing unit moves.

In accordance with a first aspect of the present invention, the recording head and turntable are mounted so that the axis of the turntable is movable relative to the recording head, with the direction of that movement being defined by an air bearing.

The use of such an air bearing has the advantage of providing very low or essentially negligible friction in the desired direction of motion, combined with great stiffness to motion in other directions.

In order to control the relative motion of the recording head and the turntable bearing assembly, it is clear that in order to retain the full advantage of using a friction-free air bearing to support this motion (whether by moving the recording head or by moving the turntable bearing assembly) the driving mechanism should not of itself add friction.

Friction-free means of causing relative motion are known, for example electric motors using a current-carrying coil of wire mounted in a magnetic field, or movable permanent magnets acted on by a variable magnetic field, or induction or hysteresis motors using movable electrically conducting or ferromagnetic elements acted on by a travelling alternating magnetic field. Generally such driving means have in common the property that in response to some control signal they will exert a controllable force on the movable element; however, when applied to a movable assembly mounted on an air bearing, they do not characteristically act in such a way as to define the position of the movable element, but only in such a way as to define its acceleration, since the mechanical behaviour of the moving element on its friction-free bearing is dominated by its inertia. This behaviour is in contrast to that of a leadscrew actuator, which is mechanically stiff and directly determines the position of the movable element. Additional suitable means are therefore necessary to control the position of the movable element.

It is well known in the art to control the relative motion of two elements by providing position sensing means to detect the motion, together with an amplifier responding to both the output of the position sensing means and an externally supplied control signal, the output from the amplifier providing the control input to the motor or other driving means in such a way that the resulting motion is constrained in accordance with the externally supplied control signal. In other words, this is a negative feedback servo-loop. Such a system characteristically has an upper frequency limit (or bandwidth) such that for motions having components predominantly below this frequency limit the motion is well controlled by the feedback loop whereas for motion having components predominantly at higher frequencies the feedback loop exerts little control.

In the arrangement described above, relating to the control of a massive assembly mounted on a friction-free bearing, the choice of bandwidth (which may be readily adjusted by changing, inter alia, the gain of a suitable amplifier) may be a difficult compromise. In the absence of feedback control a system consisting of a massive assembly mounted on a friction-free bearing is very vulnerable to external vibration, since in the presence of such vibration causing the normally "fixed" elements of the system to move, the tendency of what would normally be termed the "moving" elements is to remain stationary owing to their inertia, resulting in a large relative motion between the two. If the bearing is a rotary one, the sensitivity to linear vibrations may be reduced by balancing the moving assembly. There remains, however, a sensitivity to vibrations which have a rotational component about the axis of the bearing. To suppress such relative motion the feedback loop must have a large bandwidth, covering all the frequencies at which external vibrations may be present.

If this is done the external vibrations are attenuated as regards relative motion between the "movable" and "fixed" elements, but at the same time any noiselike or other fluctuations inherent in the signal generated by the position sensing means increase in importance; for the action of the negative feedback loop is such as to attempt to hold the reading obtained from the position sensing means to a set value, determined by the external control signal, so that the inherent fluctuations in this reading therefore appear, with opposite sign, in the actual position of the movable element. Specifically, those inherent fluctuations which fall within the frequency bandwidth of the negative feedback loop become imposed on the actual position of the movable element. Increasing the bandwidth therefore attenuates external disturbances but increases the effect of fluctuations in the position sensor reading. In the context of videodisk or compact disk mastering, it may be difficult to find a bandwidth great enough to remove the external vibrations which does not unacceptably increase the uncertainty caused by these inherent fluctuations.

It should be noted that the above discussion holds equally, whether the output of the position sensing means is directly representative of the relative position of the movable and fixed parts (so that the feedback loop acts in such a way that the external control signal controls the relative position), or whether the said output is representative of their relative velocity (in which case the external control signal controls their relative velocity). Similar considerations govern the choice of bandwidth in both cases.

There is therefore a need to reduce the effect of external vibrations without relying on a negative feedback loop of the high bandwidth.

In accordance with the first aspect of the present invention, there is provided passive damping of the motion of the movable elements, for example by a fluid-filled dashpot. With such a dashpot, an outer element is secured to e.g. a fixed element (or frame) of the system and an inner element is secured to the movable assembly mounted on the friction-free bearing described above. Such a dashpot offers viscous resistance to the motion of the movable elements. By contrast to the effect of inertia alone, which is such as to stabilise the motion of these elements with reference to an external (inertial) frame, the effect of such viscous damping is to tend to stabilise the motion of the movable elements with reference to the frame of the machine itself, and thus to attenuate rather than to accentuate any vibrations in the frame as far as relative motion between the "movable" and "fixed" elements is concerned. Moreover, this attenuation occurs by purely passive means, and does not add noise or fluctuations as the negative feedback servo loop described above would have done.

It is necessary, by way of explanation to make a clear distinction between the effects of friction and the effects of viscous drag. Friction occurs when two solid parts are in contact, and is characterised in that in order to cause a sliding motion between the parts it is necessary to apply a force which exceeds a certain threshold, no matter how slow the desired motion may be. Viscous drag, as produced by a dashpot, by contrast sets up a force in resistance to relative motion which decreases as the speed of relative motion decreases, so that the rate of motion may be readily controlled by varying the applied force, down to the smallest speeds. It is an object of the present invention to eliminate friction forces by the use of an air bearing, and to replace them by viscous forces by the use of a dashpot.

To control the motion of such a system a negative feedback servo loop, as described above, may be employed. However, since the dashpot provides the means of attenuating the effect of external vibrations, and also since the required speed of motion changes only gradually with the radius of the recorded information on the disk in the case of constant-linear-velocity (CLV) recording, and may not change at all in the case of constant-angular-velocity (CAV) recording, this servo loop may have a small bandwidth (i.e. a long response time) such that any fluctuations introduced into the motion as a result of inherent noise in the position sensing means are not important. A bandwidth corresponding to a response time of 5–10 seconds has been found by the applicants to be suitable.

In accordance with a development of the first aspect of the present invention, a rotary bearing is used to support the relative movement of the recording head and the axis of the master disk in an arc rather than a straight line. In a preferred embodiment the recording head remains stationary while the turntable bearing unit moves, and the arc of relative motion is such that there is a position where the recording head lies directly on the axis of the master disk. This enables information or visible markings to be recorded as close to the centre of the final record as may be desired. Also in the preferred embodiment the axes of both the turntable bearing and the second rotary bearing which supports it are vertical, so that there is no gravitational force tending to move the turntable bearing unit one way or the other.

It may be thought that it is functionally inferior to allow the recording head to move in an arc relative to the axis of the disk rather than in a straight line. In fact, in the case of gramophone record mastering, since it is almost universal to play gramophone records by a stylus mounted on a swinging arm, it may well be that, if the master disk is recorded by a stylus moving relatively in a curve of similar geometry to that of the playback stylus, then the tracing distortion (arising during playback from the variation in orientation between the stylus and the recorded groove) may actually be less than with a linear motion. In the case of optical recording of videodisks of the "Laservision" type and compact disks using a focused light spot, the recording process is not strongly sensitive to the orientation of the recording head to the recorded grooves. Furthermore, at least in the case of videodisks and compact disks recorded at a nominally constant linear velocity (CLV), the effect of the arcwise motion on the linear recording velocity is negligible notwithstanding that the arcwise motion has an angular component relative to the disk, because the arcwise motion is very slow compared with the rotational motion of the master disk.

The first aspect of the present invention may thus provide a viscous dashpot to damp and control the radial element of relative motion of recording head and master disk in a disk recording system where the relative motion is required to be in the form of a smooth spiral.

Preferably, the master disk rotates relatively rapidly on a first bearing and the relatively slow radial element of the said relative motion is supported by a second rotary bearing so that the radial element of the relative motion is a circular arc.

Preferably, the force to produce the relative motion is provided by a direct-drive electric motor using the moving-coil, moving magnet, induction or hysteresis principle.

Alternatively, the force to produce the said relative motion is provided by a spring, whose other end may be moved controllably by a geared motor assembly.

The first aspect of the present invention may also include a bearing arrangement for supporting the relative motion of the recording head and the master disk in a disk recording system where the relative motion is required to be in the form of a smooth spiral, in which the master disk rotates relatively rapidly on a first bearing and the relatively slow radial element of the said relative motion of the recording head and the first bearing is supported by a second rotary bearing so that the relative motion is a circular arc.

Preferably the second rotary bearing is then an air bearing, the entire assembly of the master disk on its turntable and bearing is supported on a bracket mounted on the rotor of the second rotary bearing, and the recording head is fixed.

The first aspect of the present invention may also include means for sensing the relative motion of two parts whereby a movable set of conducting elements may move in a transverse direction between two sets of fixed conducting elements carrying alternating voltages of opposite phase and the capacitively induced voltage on the said movable elements forms the input to a phase-sensitive detector, the reference input of which is the said alternating voltage applied to one set of fixed conducting elements, so that the d.c. output of the said phase-sensitive detector is a voltage representative of the relative position of the fixed and moving elements.

Preferably, the relative motion to be sensed is a rotational one, and the fixed and moving elements have the shape of circular sectors.

Preferably, an additional voltage representative of the rate of relative motion of the fixed and moving elements is obtained electronically from the voltage representative of the relative position of the same elements.

Preferably, the force to produce the relative motion is controlled by a linear servo amplifier whose inputs are the voltage representative of the rate of relative motion obtained as above and a reference voltage representative of the desired rate of relative motion.

A second aspect of the present invention will now be discussed.

From Equation 3, if R=0 at time $t_o$, then Equation 4 below holds:

$$R = \left\{ \frac{Pv}{\pi} (t-t_o) \right\}^{1/2} \quad \text{Equation 4}$$

From this, it follows that:

$$\omega = \left\{ \frac{P}{\pi v} (t-t_o) \right\}^{-1/2} \quad \text{Equation 5}$$

Thus, both R and ω are non-linear functions of time.

It would be possible to generate these functions of time in a digital computer, and feed the functions to digital to analog converters to obtain voltages representative of the required values of R and ω. It would then be possible to use those voltages to control servo systems governing the radial and rotational motions. However, such an arrangement has the disadvantage that the values of R and ω thus obtained necessarily change in a stepwise manner, the magnitude of those steps depending on the resolution of the digital to analogue converters.

It would also be possible to use a digital computer to generate a value of the rate of change of radius R, given by equation 6 below.

$$\frac{dR}{dt} = \left( \frac{Pv}{4\pi(t-t_o)} \right)^{1/2} \quad \text{Equation 6}$$

This value, together with the value of ω derived by Equation 5, could be used to derive values which could then be output via digital to analog converters and fed to servos controlling the radial and rotational velocities. A single digital to analogue converter could be used for both values, since they have the same time dependence. Such an arrangement would have the advantage that there are not the stepwise variations in R, but only in its rate of change $dR/dt$ and the effect on the recorded disk is much less severe. However, the provision of an appropriate computing system means that complexity is high.

The second aspect of the present invention therefore seeks to obtain the necessary relationships between R and ω by analog means. At its most general, the present invention proposes that signals are generated corresponding to R and ω; the product of these two signals is then used to control the rotation of the turntable in dependence on the difference between that product and a reference value.

A signal $V_R$ corresponding to the radius R is generated, as is a signal representative of and proportional to the rotation velocity ω. The former is preferably a voltage signal and the latter is preferably a frequency signal. Such a frequency signal may be produced by a slotted strobe disk attached to a shaft of the disk recording system, which may be sensed by suitable optical means. The signal $V_R$ and the frequency signal may then be combined in a multiplying discriminator circuit which generates a suitable signal proportional to the product Rω. This product may be a voltage signal, which may then be compared with a reference voltage $V_O$ representative of the desired linear velocity. The difference in voltages may then be used to drive a servo amplifier, which in turn drives a motor which rotates a turntable of the disk recording system.

Thus, with the second aspect of the present invention, it is possible to form a servo loop which tends to hold the product Rω constant and equal to the desired linear velocity. A separate discriminator circuit may also be used to derive from the frequency signal a voltage $V_c$ representative of the quantity $P\omega/2\pi$, where P is the desired track pitch. This voltage $V_c$ may then be compared with a voltage $V_s$ derived from the voltage $V_R$, which represents the quantity $dR/dt$.

The difference between the voltages $V_c$ and $V_s$ may then drive a servo amplifier whose output causes radial motion. Thus, the action of this second servo loop is such as to tend to hold $V_s = V_c$ and thus to hold the radial velocity $dR/dt$ equal to the desired value $P\omega/2\pi$.

Preferably the disk recording system is used for optical recording of videodisks or audio or data compact disks.

BRIEF DESCRIPTION OF THE DRAWINGS

An embodiment of the present invention will now be described in detail, by way of example, with reference to the accompanying drawings, in which:

FIGS. 3a and 3b illustrate a first rotary dashpot which may be used in the present invention, FIG. 3a being a sectional view and FIG. 3b being a detail of the dashpot mechanism;

FIGS. 6a and 6b illustrate another arrangement using a spring for applying a torque to the shaft of the main air bearing in the embodiment of the present invention, together with a means for monitoring the strain on the spring, FIG. 6a being a perspective view of the arrangement and FIG. 6b being a detailed view of part the arrangement of FIG. 6a;

FIGS. 8a and 8b illustrate a capacitive electrical sensing device for use in the embodiment of the present invention, FIG. 8a being a sectional view and FIG. 8b being an exploded view of the disks of FIG. 8a;

DETAILED DESCRIPTION

Figure 1:
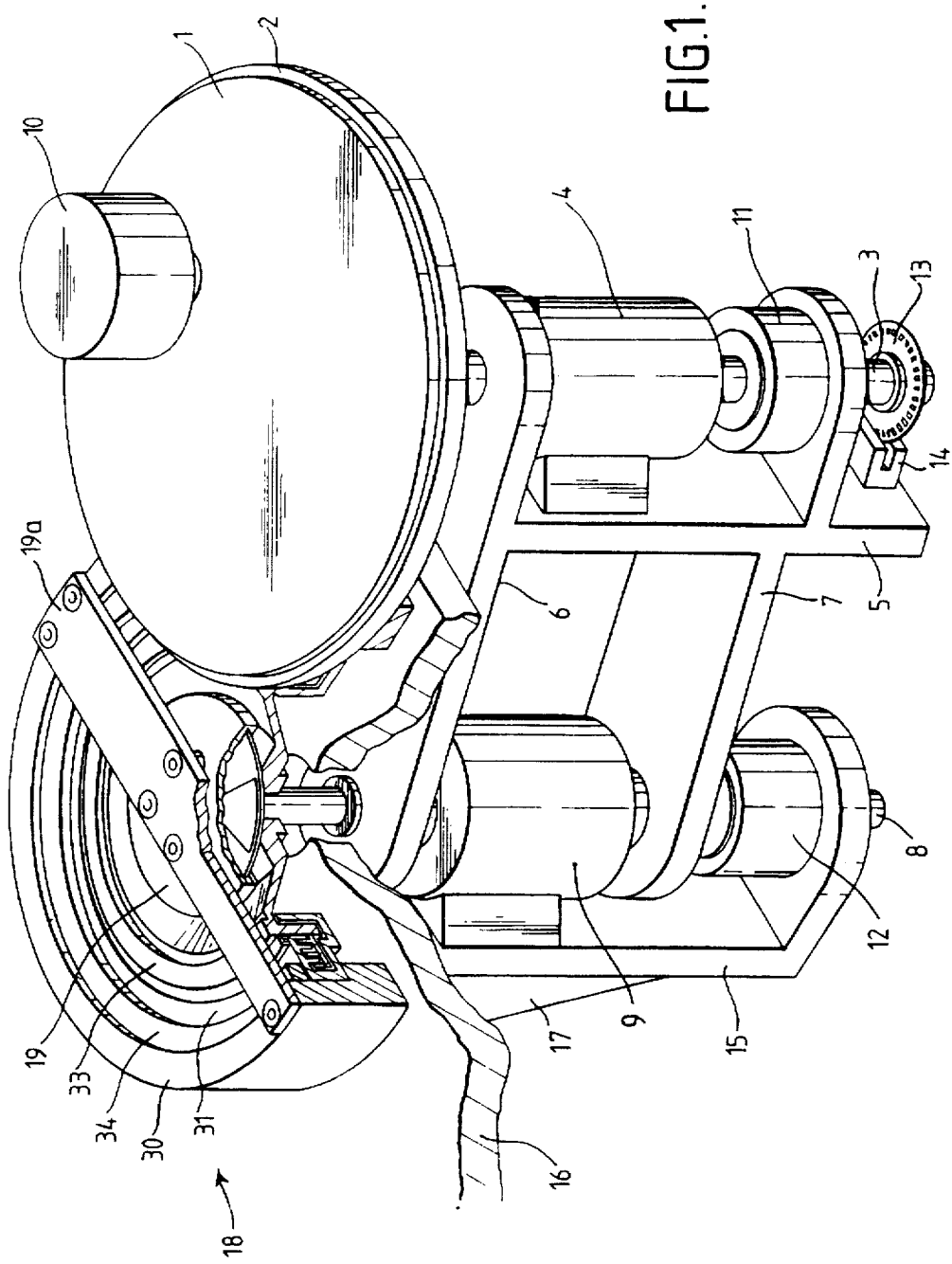
FIG. 1 is a schematic view of a disk recording system according to an embodiment of the present invention.

FIG. 1 illustrates the general structure of a disk recording system being an embodiment of the present invention. A master disk 1 is supported on a turntable 2 which in turn is mounted on a shaft 3. That shaft is the inner element of a turntable bearing 4 (or is an extension of the inner element). The turntable bearing 4, which carries the turntable 2, is mounted on a bracket 5 held by arms 6,7 which arms 6,7 are supported by the shaft 8 of a main bearing 9. The turntable bearing 4 and the main bearing 9 are, in this embodiment, rotary air bearings, and their axes are vertical.

Furthermore, a recording head 10 is mounted so as to be located above the turntable 2 and hence above the disk 1. In this embodiment, the recording head 10 is fixed, and the relative motion in the horizontal plane of the disk 1 and recording head 10 is achieved by rotation of the turntable 2 and movement of the arms 6,7.

The rotation of the turntable 2, about shaft 3, is governed by the turntable bearing 4, and the movement of the arms 6,7 on the shaft 8 is governed by the main bearing 9. The arms 6,7 are positioned so that the recording head 10 will follow an arc-shaped path relative to the axis of the turntable bearing 4, extending between the centre and the periphery of that disk 1.

The rotation of the turntable 2 on the shaft 3 is driven by a first motor 11, and the movement of the arms 6,7 on the shaft 8 are driven by a second motor 12. In this embodiment, both motors are electronically commutated motors with permanent-magnet rotors; the rotors are mounted directly on the shafts 3,8 so that no separate bearings are required.

Also mounted on the shaft 3 is a slotted strobe 13, the rotation of which is sensed by an optical sensor 14. The sensor 14 generates two outputs which are square-wave signals in a quadrature relationship. These outputs are used in a servo system for controlling the rotation speed of the turntable 2.

The main bearing 9 is supported by a vertical bracket 15 which in turn is supported from the underside of a horizontal mounting plate 16 by a bracket 17. Mounted on the upper side of mounting plate 16 is a damper unit 18 which will be described in more detail later. Also mounted above or within the concave-topped element 33 from a bracket 19a is a position sensing unit 19 which will also be described in more detail later.

As has previously been mentioned, the present invention requires that the relative movement of the head and the turntable bearing be damped. In an embodiment where this relative motion is linear, this may be achieved by a linear dashpot, such as shown in FIG. 2.

Such a dashpot may be provided in the case where there is linear motion, for example where a linear air bearing is used, by the use of a piston moving in a fluid-filled cylinder. It is important in the present invention that all friction be avoided; therefore a conventional seal cannot be used to prevent leakage of fluid around the shaft of the piston, and instead (if the motion is to be horizontal) an arrangement corresponding to that of FIG. 2 is best used, incorporating shrouding means to prevent dust from falling into the fluid.

Figure 2:
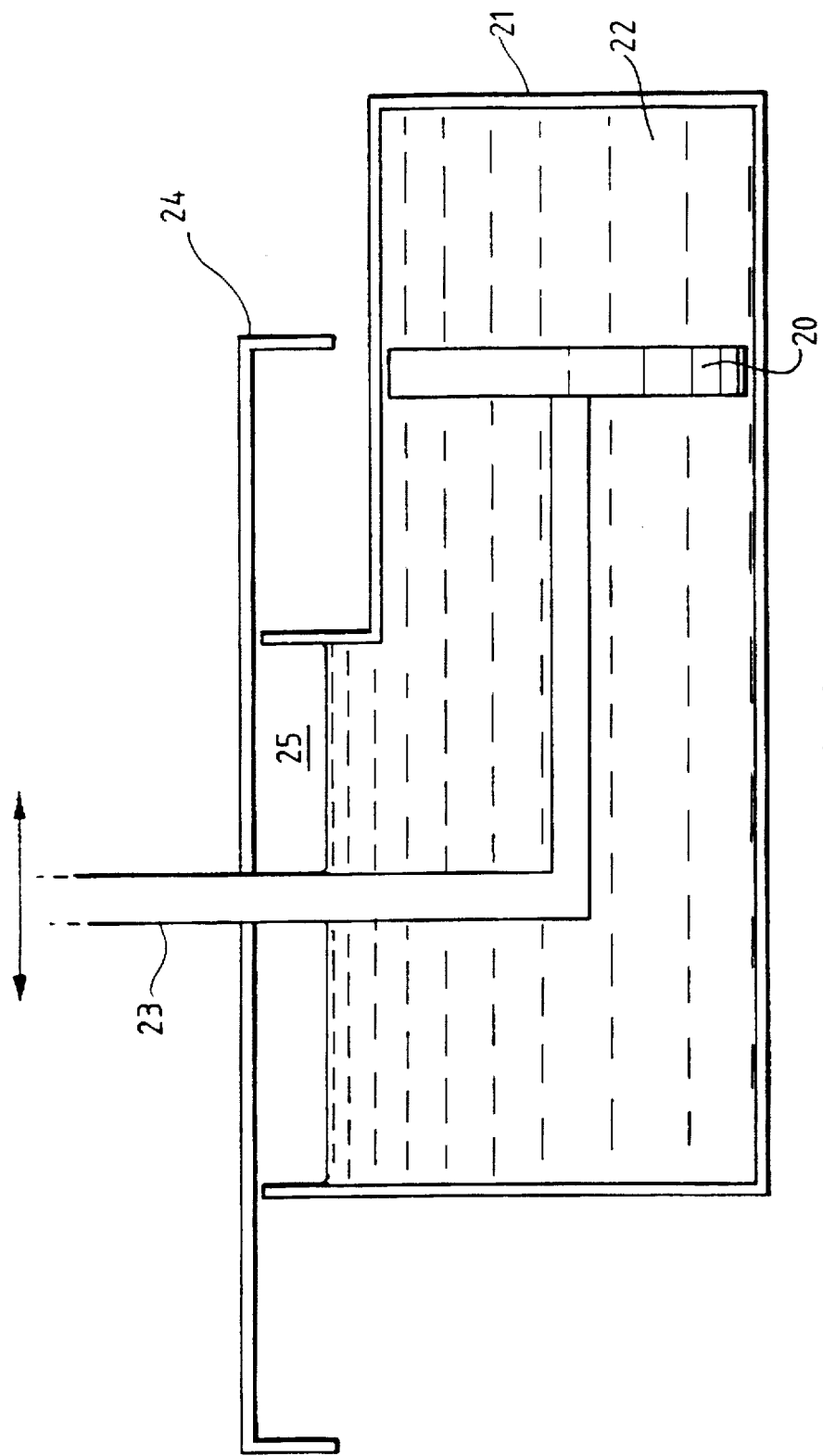
FIG. 2 illustrates a linear dashpot which may be used in the present invention.

Thus, FIG. 2 shows that a piston 20 is mounted in a container 21, which container 21 is filled with viscous fluid 22. The piston has a bracket 23 which extends out of the container 21 and is fixed to the object whose movement is to be damped. The dust cover 24 is fixed to the bracket, covering the opening 25 in the container through which the bracket 23 extends, to prevent the ingress of dust.

Preferably, however, the dashpot used in the present invention is a rotary one, and is used in connection with a rotary air bearing, the axis of which is vertical.

FIG. 3a shows the construction of a dashpot which consists of interleaved thin annulae.

In FIG. 3a, an annular mount 30 supports a fixed damping element 31. The fixed damping element 31 surrounds a shaft 32 (which may e.g. correspond to shaft 8 in FIG. 1 so that the dashpot corresponds to the damper unit 18 of FIG. 1) and a moving damping element 33 is fixed to that shaft. The fixed damping element 31 is secured to the mounting 30 by a clamping member 34, which is pressed down by springs (not shown).

As shown in more detail in FIG. 3b static vanes 35 are provided in the fixed damping element 31, which are interleaved with moving vanes 36 secured to the moving damping element 33. A viscous fluid 37 fills the resulting dashpot.

Figure 4A:
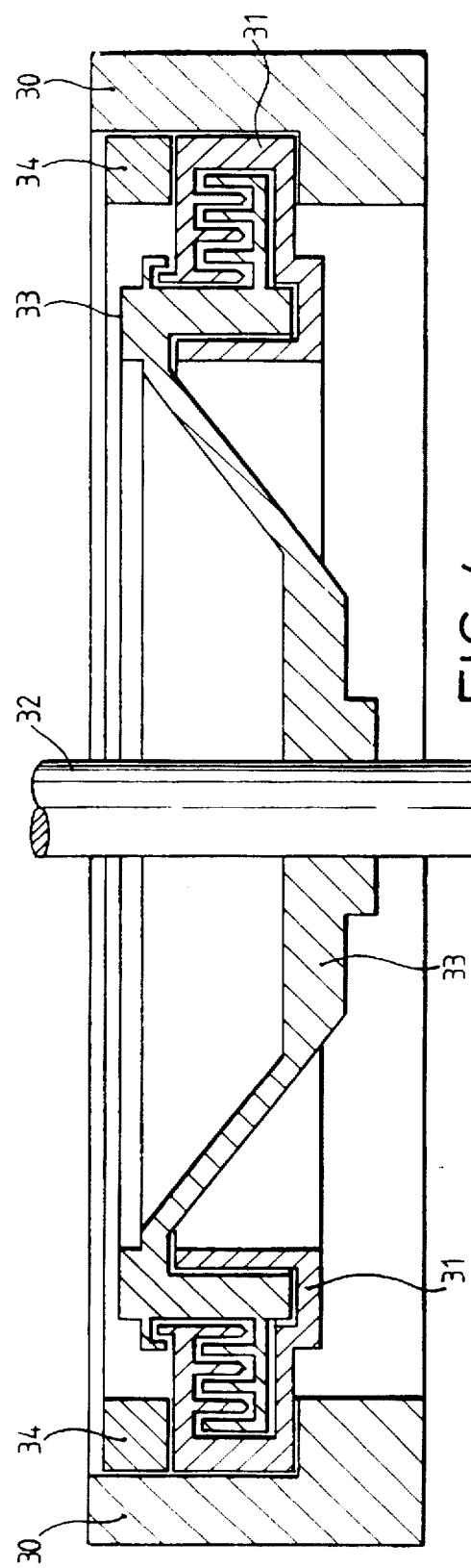
FIGS. 4a and 4b illustrate a second rotary dashpot which may be used in the present invention, FIG. 4a representing a sectional view and FIG. 4b illustrating a detail of the dashpot mechanism.
Figure 4B:
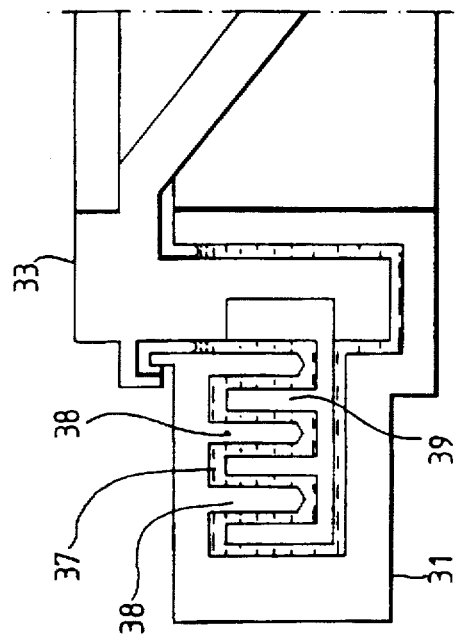

FIGS. 4a and 4b illustrate an alternative dashpot arrangement, having interleaved concentric cylindrical sections. Components of FIGS. 4a and 4b corresponding to those of FIG. 3a and 3b are indicated by the same reference numerals. As can be seen from FIG. 4b, however, the static cylindrical sections 38 are vertical, as are the moving vanes 39. Again, if this dashpot is used in the embodiment of FIG. 1, the shaft 32 may correspond to the shaft 8 so that the dashpot forms the damper unit 18.

The cylindrical geometry of FIGS. 4a and 4b is preferred because is allows freedom of adjustment of the movable elements in a vertical direction and because it is easier to fill the structure with fluid without causing bubbles. Radial gaps may be left at intervals in one set of cylindrical sections, in order to allow the fluid to distribute itself evenly. A very high viscosity is required to control the very slow speeds of motion required for example in compact disk recording, but suitable fluids are readily obtainable, for example the fluids sold under the brand name "Hyvis" by British Petroleum Ltd. and available in a range of viscosities. In order to fill the structure with fluid, the viscosity of the fluid may be reduced by heating it. A further feature of the use of a rotary bearing in conjunction with a rotary dashpot according to this embodiment of the present invention is that rapid changes to the position of the movable elements may be effected by raising the clamp 34 to free the entire dashpot assembly so that the outer dashpot element 31 rotates within its mountings 30.

The driving force to produce the relative motion of moving and fixed parts may, as stated above, be generated by a direct-drive electric motor using the moving-coil, moving-magnet, induction or hysteresis principles. In accordance with the principles expressed above the motor must not contribute any friction to the relative motion; this is readily achieved if the moving part of the motor has no bearings of its own but is mounted directly on the shaft 8 of the rotary air bearing. If commutation of the drive current is required (as in conventional moving-coil d.c. motors) then it should be generated electronically by any of a variety of known means, rather than by mechanical switching.

Alternatively, it has been found possible to exert the necessary torque on the moving system by means of a spring, for example a coil spring whose further end is secured, for example, to the output shaft of a reduction gearbox, the input shaft of which is driven by a conventional d.c motor. It is apparent that even if the said output shaft is held in a fixed position, the spring will exert a torque which changes only slowly as the moving parts of the air bearing and damper assembly rotate; thus it is in the nature of this arrangement to produce a substantially constant relative motion by purely passive means, and any adjustments to the speed of relative motion can be performed by driving the gearbox in a relatively crude manner.

Figure 5:
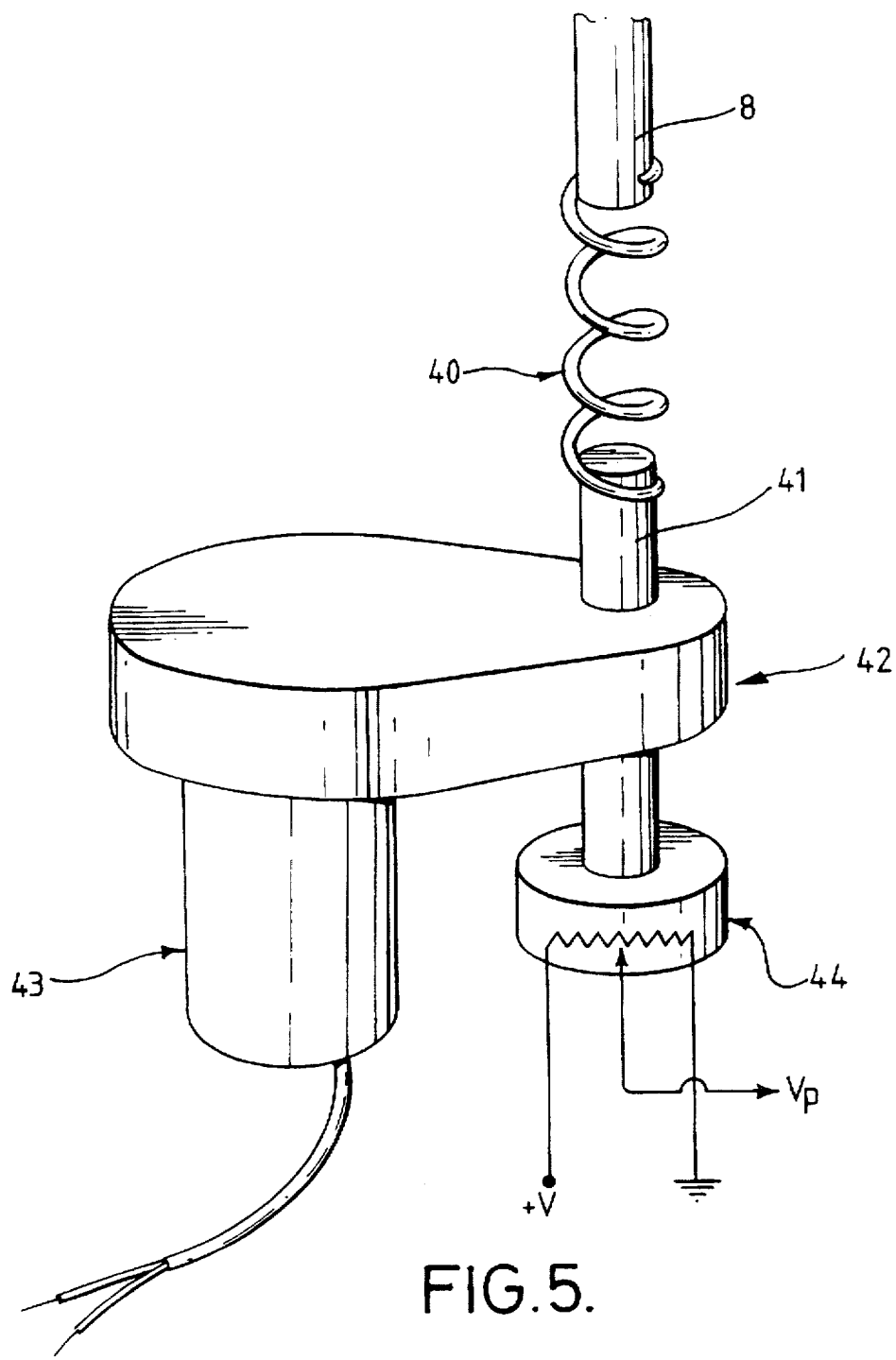
FIG. 5 illustrates an arrangement using a spring for applying a the torque to the shaft of the main air bearing in an embodiment of the present invention, together with a means for monitoring the rotation of the end of the spring remote from the shaft.

Thus, FIG. 5 shows that the shaft 8 of the main bearing 9 in FIG. 1 is connected to a spring 40, which in turn is connected to the output shaft 41 of a gearbox 42, which gearbox 42 connects the shaft 41 to a motor 43. It is found advantageous to place the motor/gearbox assembly in an inner servo loop having a relatively short response time. In order to make this possible, the shaft 41 also extends to a rotary potentiometer 44. Thus, the output signal $V_P$ of the potentiometer 44 corresponds to the position of the shaft 41.

Figure 6B:
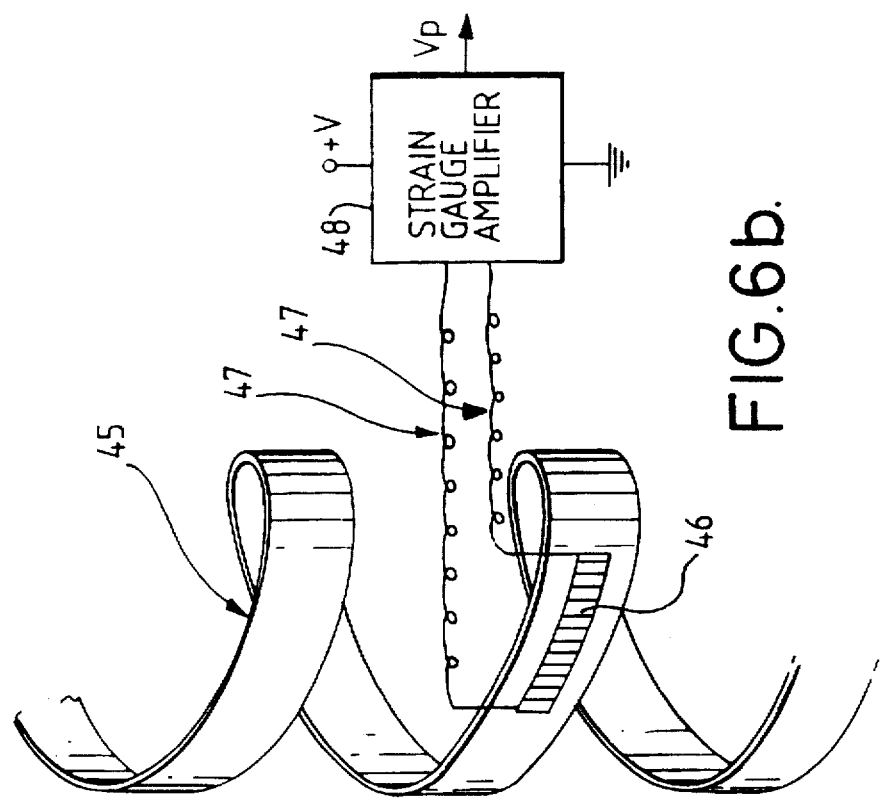
Figure 6A:
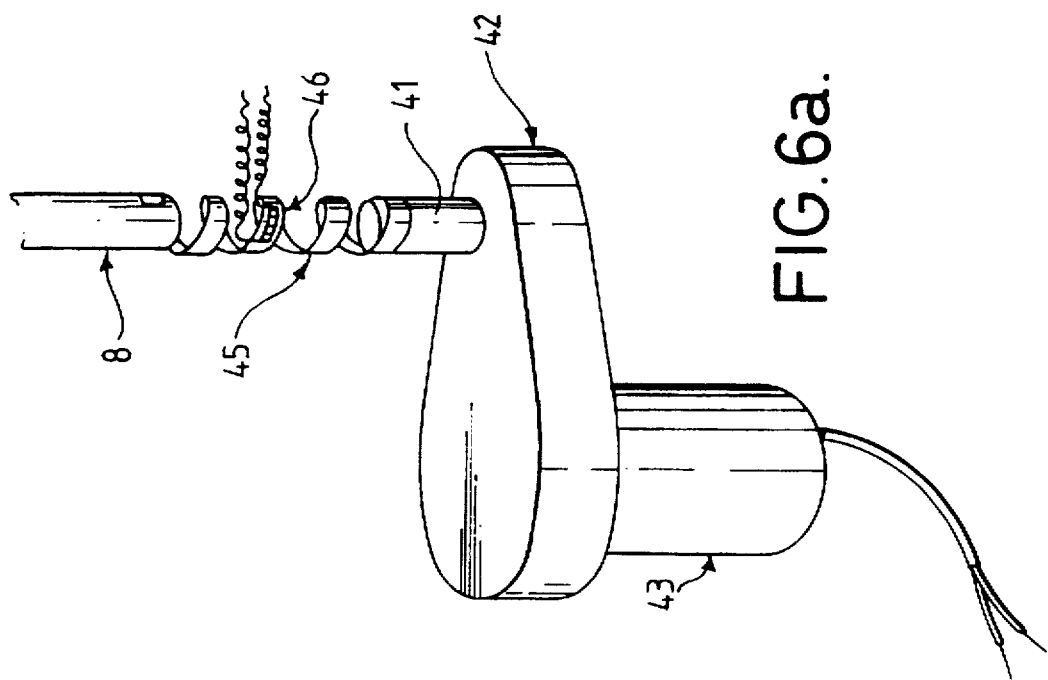

FIGS. 6a and 6b illustrate an alternative arrangement, in which the strain in the spring itself is sensed in order to drive the inner servo loop. Components which correspond to those of FIG. 5 are indicated by the same reference numerals. In FIG. 6a, the spring 45 has a flat section, and a strain gauge 46 is mounted thereon. As is shown in more detail in FIG. 6b, the strain gauge is connected via flexible connections 47 to an output amplifier 48, which generates an output signal $V_P$.

Figure 7:
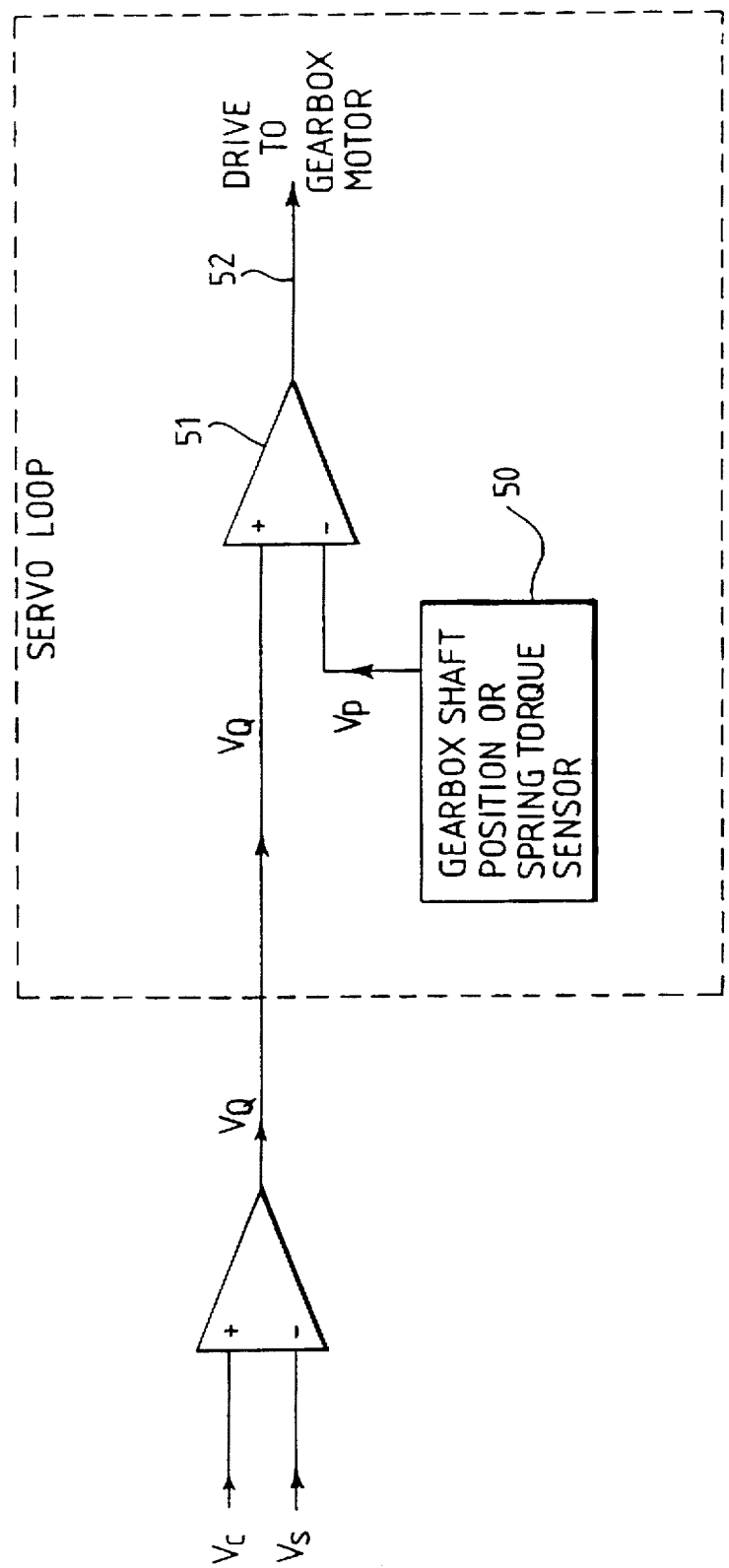
FIG. 7 shows a local servo loop for controlling the motor arrangement of FIG. 5 or FIGS. 6a/6b of the first embodiment of the present invention.

FIG. 7 shows the inner servo loop referred to above. In FIG. 7, the gearbox shaft position sensor (from FIG. 5) or the spring torque sensor (from FIGS. 6a and 6b) is shown at 50. The output signal $V_P$ from this sensor is fed to a differential amplifier 51. That differential amplifier 51 also receives a control voltage $V_Q$ and generates an output 52 which drives the gearbox motor 43. Thus this inner servo loop causes the sensor output $V_P$ to follow the control voltage $V_Q$.

The signal $V_Q$ is generated by a further servo loop (which will be discussed in more detail later) which has a slow response, so that the position of the gearbox output shaft, and hence the torsion in the spring and hence the speed of motion of the movable elements (namely the main air bearing rotor, the movable part of the dashpot and the complete turntable bearing assembly), is controlled by comparing an external control voltage $V_c$ with a voltage $V_s$ representative of the speed of motion and obtained from position sensing means for example as described below.

Figure 8A:
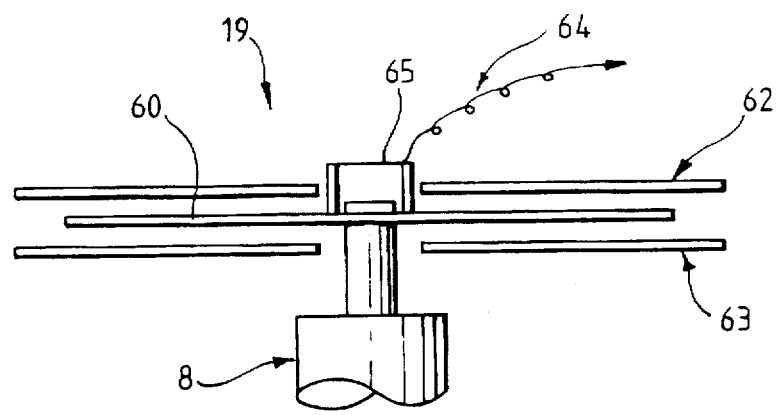
Figure 8B:
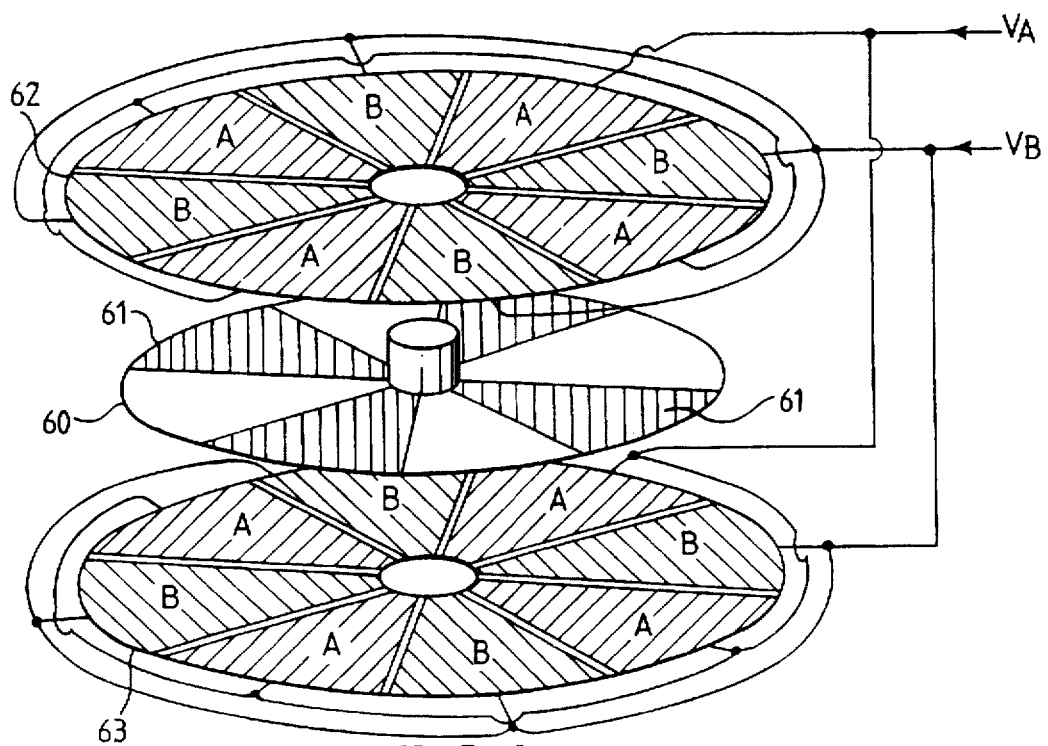

Turning now to the means of sensing the position of the movable parts, which may form the sensor unit 19 in FIG. 1, it is proposed that a capacitive electrical sensing device is provided as in FIGS. 8a and 8b. In the arrangement illustrated, the shaft 8 of the main bearing 9 carries an insulating disk-shaped rotor 60. This rotor carries on both its surfaces conducting sectors 61 occupying part of each surface. This rotor is mounted between insulating plates 62,63 attached to the fixed framework, each of which carries on its inward-facing surface conducting sectors (A,B) separated by narrow gaps. The number of such sectors depends on the angular range of rotation which it is desired to sense, but in the arrangement illustrated there are eight sectors allowing a maximum movement of 45°. The rotor 60 carries on each face four sectors 61, each subtending 45° at the centre and equally spaced apart so that the spaces between them also subtend 45°. The conducting sectors 61 on the two faces of the rotor 60 are aligned together and are all electrically connected to a conducting cylinder 65 and a flexible lead 64. The conducting sectors on the two fixed plates 62,63 are aligned in opposite-facing pairs which are electrically connected, and in addition alternate sectors on each plate are electrically connected, so that there are in all two sets of alternate sectors (A and B) each sharing a common electrical connection on the two fixed plates 62,63.

Alternative, but functionally equivalent methods of construction will of course be apparent to those skilled in the art, for example to form either the fixed conducting sectors, or the moving ones, or both, from metallic material in ways other than by forming them on the surface of an insulating material, and in particular for all the moving sectors to form one self-supporting piece of metal.

Figure 9:
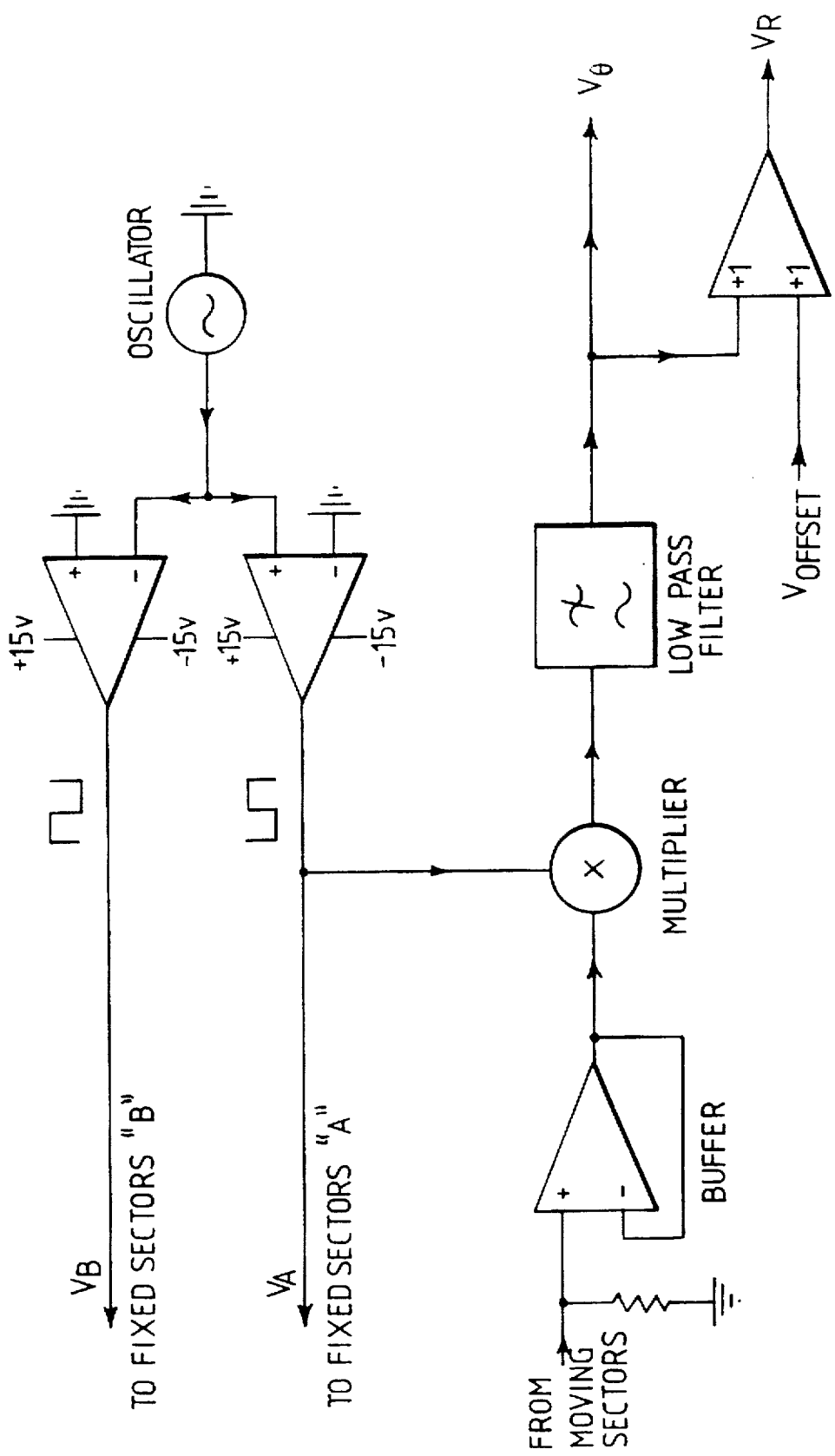
FIG. 9 is a block diagram of an electrical circuit for processing the output of the sensing device of FIGS. 8a and 8b.

Then equal and opposite alternating electrical voltages ($V_A$ and $V_B$) are applied to the two sets of fixed sectors. Preferably, these voltages are square waves of amplitude for example 30 volts peak-to-peak. As a result of capacitance between the conducting sectors on the rotating disk 60 and the sectors on the fixed plates 62,63, an alternating voltage appears on the conducting sectors on the disk 60, of waveform similar to that of the voltages applied to the sectors of the fixed plates 62,63 and of magnitude and phase depending on the azimuthal position of the said conducting sectors on the rotating disk 60 in relation to the sectors on the fixed plates 62,63. This voltage may be buffered (and optionally amplified) by, for example, an operational amplifier of low gain and high input impedance, connected by the flexible lead 64, and forms the input to a phase-sensitive detector (essentially a multiplier followed by a low-pass filter) whose reference input is the waveform applied to one set of the fixed sectors as shown in FIG. 9. From this phase-sensitive detector a d.c. output $V_θ$, is obtained, which is representative of the orientation (θ) of the moving sectors relative to the fixed sectors.

Figure 10:
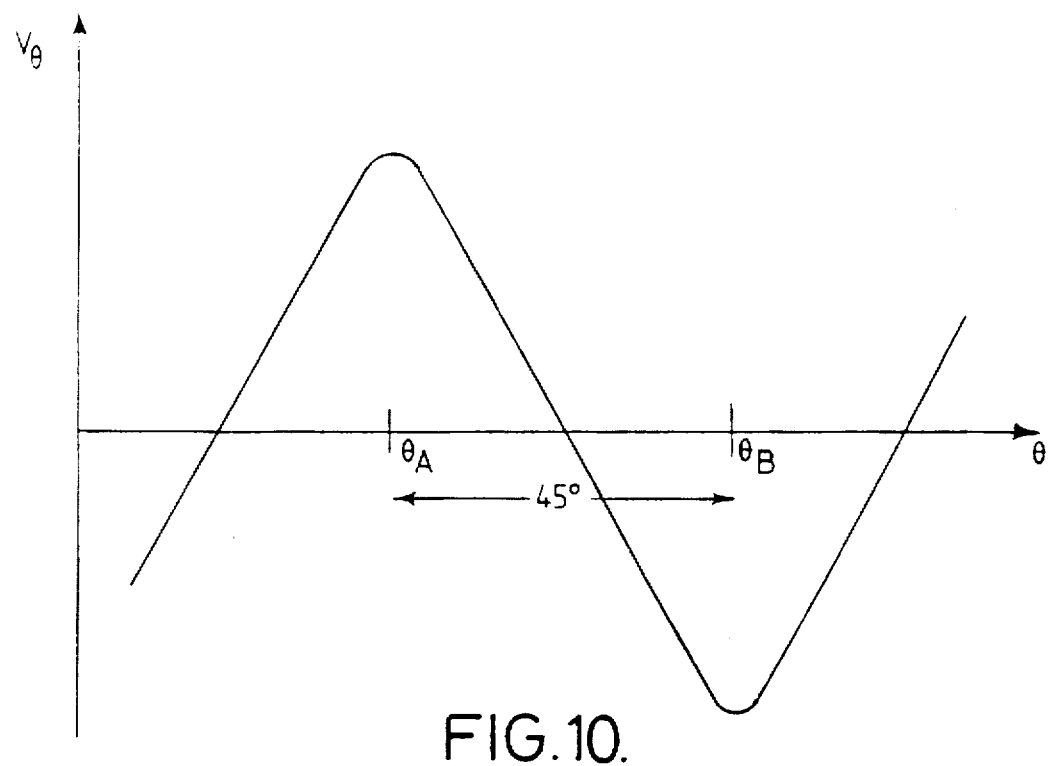
FIG. 10 shows the variation of the output $V_\theta$ from the circuit of FIG. 9.

It may readily be shown that the d.c. voltage $V_θ$ is substantially proportional to $$\frac{C_A - C_B}{C_A + C_B},$$

where $C_A$ and $C_B$ are the capacitances between the movable sectors and one or other set of fixed sectors respectively. If the disk and the fixed plates are flat and parallel at all times then these capacitances are in turn proportional to the areas of overlap between the movable sectors and the respective fixed sectors. If the sectors have circular inner and outer edges, then these areas are linear functions of the azimuthal angle θ, and $C_A+C_B$ is a constant. It can then be seen that the d.c. voltage $V_θ$ is a substantially linear function of θ, except near the points ($θ_A$ and $θ_B$) at which the rotating sectors are aligned with one or other set of fixed sectors. FIG. 10 shows the dependence of $V_θ$ on θ for the case where the sectors subtend 45° at the centre. Owing to its symmetrical construction, the sensing device of FIGS. 8a and 8b is tolerant of situations where the rotor 60 is not exactly equidistant from, or parallel to, the fixed plates 62,63.

Clearly this rotation sensing device may be modified in a number of ways obvious to those skilled in the art. For example, the number of sectors may be increased so as to subtend less than 45°; the sensitivity, i.e. the rate of change of $V_θ$ with θ, is then increased but the linear working range ($θ_B$-$θ_A$) becomes less.

When this rotation sensing means is applied to the embodiment of the invention shown in FIG. 1 so as to measure the azimuthal position of the swinging turntable bearing assembly in its arclike motion, it may be objected that, although the voltage $V_θ$ is a substantially linear function of θ, it is not thereby a linear function of the distance of the recording head from the centre of the master disk. The latter distance may be expressed as $2R_c$ sin $$\left(\frac{θ - θ_o}{2}\right),$$

where $R_c$ is the radius of the motion of the turntable bearing assembly on its swinging arm and $θ_o$ is the value of θ when the recording head lies over the centre of the master disk (assuming that the system is aligned so that there is such a position), and sin $$\left(\frac{\theta-\theta_o}{2}\right)$$

is not a linear function of θ. However, a geometry may be chosen for which the linearity is adequately good for the present purpose. For example, if $R_c$=200 mm and it is desired to record compact disks with a radius of 60 mm, then $(\theta-\theta_o)$=17° maximum, and at this maximum excursion the voltage $V_\theta$ differs by only 0.4% from the value linearly extrapolated from small values of $(\theta-\theta_o)$. A correction for this error may be made electronically if necessary.

In general it will be found desirable to position the rotation sensing means such that a zero value of $V_\theta$ does not correspond to zero recorded radius (i.e. the position where the recording head lies directly over the axis of the turntable). A voltage $V_R$ which does so correspond may be obtained by adding a suitably chosen fixed reference voltage ($V_{OFFSET}$) as shown in FIG. 9.

Figure 11:
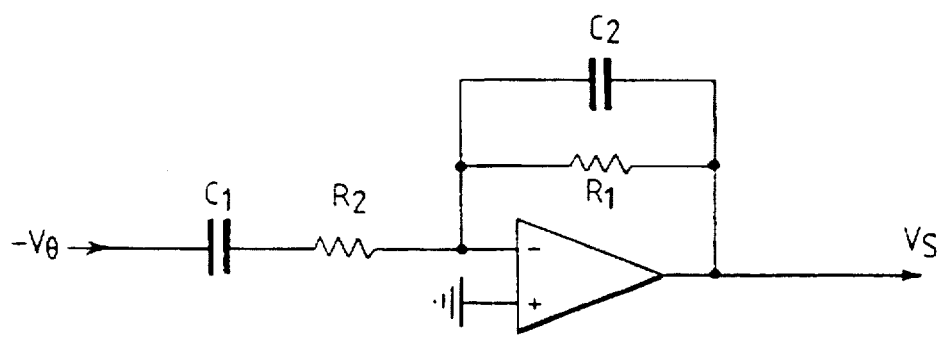
FIG. 11 shows a differentiating circuit for generating a further output voltage from the output circuit of FIG. 9.

It is found experimentally that a very good signal-to-noise ratio may be obtained with this arrangement, and in particular that it is possible to obtain electronically a second output voltage $V_s$ which is adequately representative of the rate of change of $V_\theta$ (in other words, representative of the speed of radial motion, $dR/dt$ of the recording head relative to the master disk) to be used in a servo loop to control the radial motion. The second output voltage $V_s$ may be obtained by a differentiating circuit as shown in FIG. 11. As discussed above in connection with $V_\theta$, there is a small radius-dependent error in $V_s$ (owing to the geometry of the swinging arm in the embodiment of FIG. 1), which may be corrected electronically if necessary.

The differentiating behaviour of this circuit is primarily determined by $C_1$ and $R_1$. The optional components $R_2$ and $C_2$ each serve to limit the high-frequency response of the circuit by introducing first-order low-pass responses with time constants $R_2C_1$ and $R_1C_2$, thus reducing the high frequency noise which appears in the output. It has been found possible to control the said speed of radial motion in a system for recording compact disks in the manner herein described, notwithstanding that the said speed is only of the order of a few microns per second.

Figure 12:
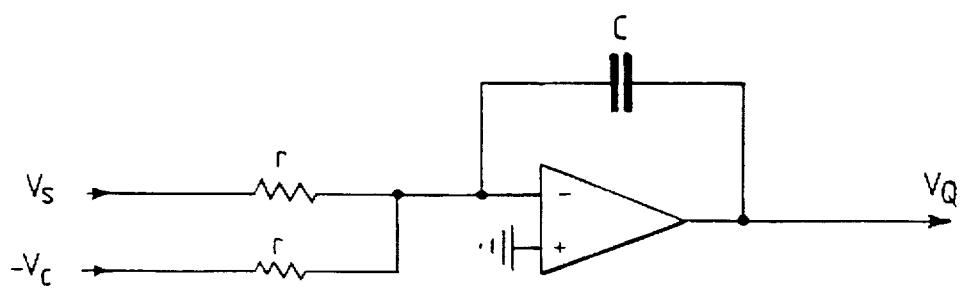
FIG. 12 shows a servo amplifier for use in the present invention.

FIG. 12 shows the structure of a suitable servo amplifier for controlling the speed of the radial motion. The voltage $V_S$ representative of the speed of radial motion is compared with a control voltage $V_C$ representative of the desired speed, and the difference ($V_S-V_C$) forms the input to an amplifier. The output $V_Q$ of this amplifier controls the speed of radial motion, for example by controlling the torque applied to a rotary bearing system damped by a dashpot, for example by a direct-drive electric motor or alternatively by rotating the one end of a coil spring whose other end is attached to the movable element. The action of the servo system is such as to tend to maintain $V_s$ equal to $V_c$. The servo amplifier shown in FIG. 12 has an integrating response, and by adjusting the values of the resistors r and the capacitor C the overall response time of the servo system may be set to a suitable value, for example 5 to 10 seconds, such a value being found to be a good compromise between a long response time causing the system to be too slow in settling down and a short response time allowing too much noise from the rotation sensor to be impressed onto the radial motion.

Figure 13:
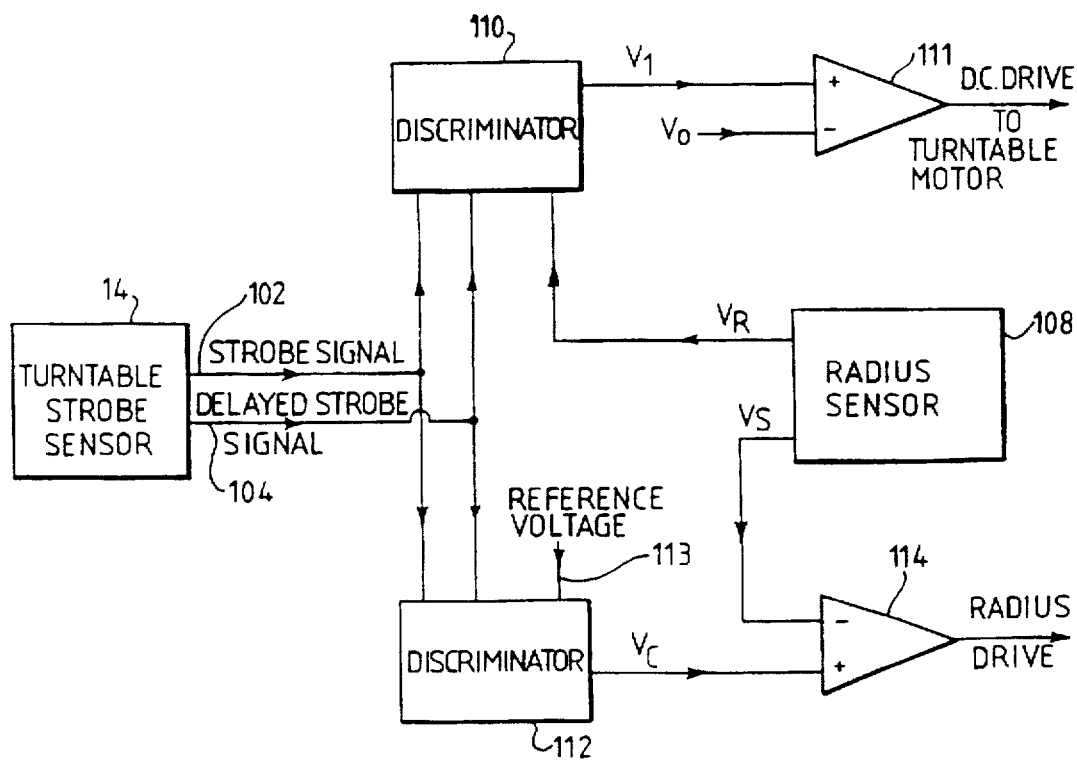
FIG. 13 shows the servo system for the disk recording system of FIG. 1.

FIG. 13 shows a servo system for controlling the disk recording system of FIG. 1. In FIG. 13, a radius sensor 108 generates both a radius voltage $V_R$ and a radial velocity voltage $V_S$. The sensor 108 thus may operate on the basis of information from the position sensing unit 19 of FIG. 1 which has been discussed in detail with reference to FIGS. 8, 9, 10 and 11. In a similar way, the rotation of the turntable 2 in FIG. 1 is monitored by the turntable strobe 13 and sensor 14, which generates a pulse train signal 102 (ideally a square wave) representative of ω and a delayed pulse train signal 104. These signals 102,104 are both passed to two multiplying discriminators 110,112. The first discriminator 110 also receives the radius voltage signal $V_R$ from the radius sensor 108. From $V_R$ and the signals 102, 104, the discriminator 110 generates a voltage $V_1$ which is proportional to $V_R\omega$. That voltage $V_1$ is compared with a reference voltage $V_O$ representative of the desired linear velocity. The comparison is carried out by a servo amplifier 111, and this generates an output acting as the DC drive to the motor 11 which rotates the turntable 2.

In a similar way, the second discriminator 112 receives the signals from the sensor 14, and also a reference voltage 113. The discriminator 112 is used to derive from the said pulse train a voltage $V_c$ proportional to ω alone, which is compared with the voltage $V_s$ which is representative of and substantially proportional to $dR/dt$.

The difference between the voltages $V_c$ and $V_s$ drives a servo amplifier 114 whose output causes radial motion. Thus the action of this second servo loop is such as to tend to hold $V_s$ equal to $V_c$. If the sensitivity of the discriminator circuit is suitably chosen in proportion to the desired track pitch P, then $V_c$ can be made representative of the quantity $P\omega/2\pi$, whereupon the action of this second servo loop is such as to hold the radial velocity $dR/dt$ equal to the desired value $P\omega/2\pi$.

In the arrangement of FIG. 13, suitable adjustment of the gains and frequency responses of the servo amplifiers 111 and 114 will normally be necessary, in a manner known to persons skilled in the art, to ensure a suitably accurate overall response consistent with stability. In particular the amplifier 114 may have the characteristics discussed above in connection with FIG. 12.

Figure 14:
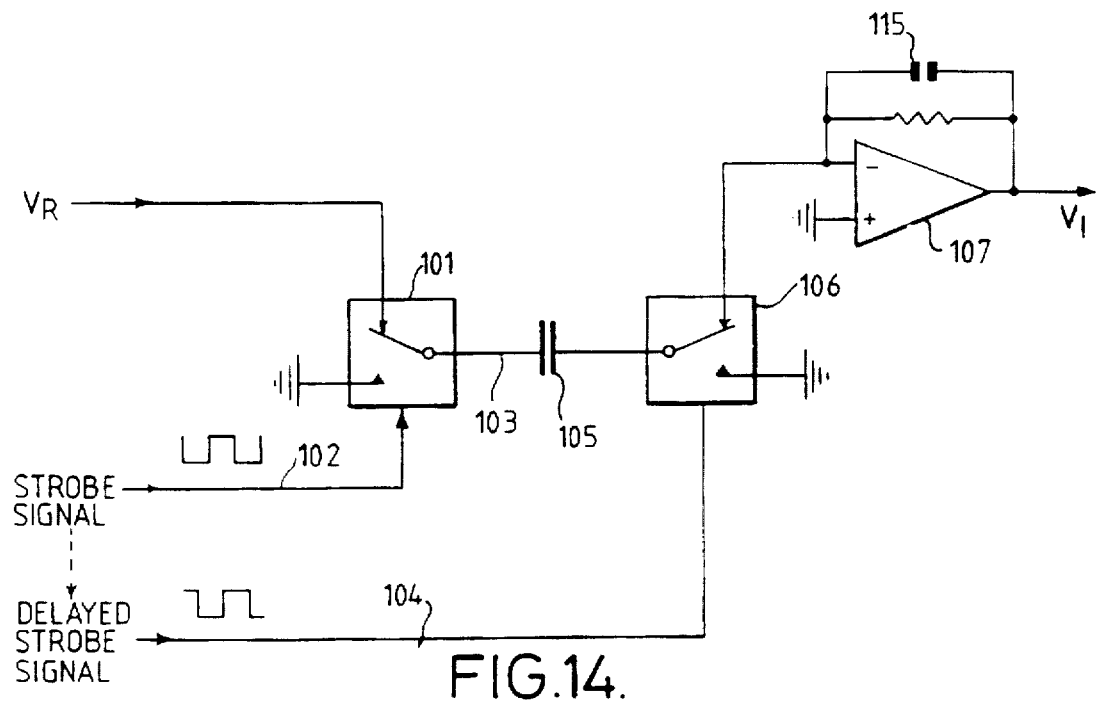
FIG. 14 shows a multiplying discriminator which may be used in the servo system of FIG. 13.

FIG. 14 illustrates a structure which may be used for the discriminator 110. The structure of discriminator 112 may be similar, with the reference voltage 113 replacing the signal $V_R$.

In FIG. 14, an electronic switch 101 is controlled by the pulse train 102 from the sensor 14. The switch 101 generates a voltage signal 103 which alternates between the radius voltage $V_R$ and ground, at the frequency of the pulse train 102. The voltage transitions of the waveform of the signal 103 cause current pulses to flow through a capacitor 105 to a second electronic switch 106, which is controlled by the delayed strobe signal 104 from the turntable strobe. That delay should be less than half a cycle. The delayed strobe signal 104 may be generated by a second optical sensor acting on the strobe disk 13, but may alternatively be generated by electronically delaying the strobe signal 102. As a result, the delayed strobe signal 104 gates the current pulses arriving from the capacitor 105, that gating being alternately between ground and the input of an amplifier 107. Thus, a mean voltage $V_1$ appears at the output of the amplifier 107 which is proportional both to $V_R$ and to the repetition rate of the strobe signal 102. Hence, $V_1$ is proportional to $V_R\omega$.

The capacitor 115 serves to attenuate the transitions in the waveform of the voltage $V_1$, which are due to the current pulses arriving from the capacitor 105.

The discriminator 112 may be the same as that of FIG. 14 except that in place of $V_R$ it uses a reference voltage 113 which does not vary with radius, but which may be set in proportion to the desired track pitch P so as to obtain an output voltage representative of $P\omega/2\pi$.

We claim:

1. A disk recording system comprising:

a recording head;

a turntable for rotatably supporting a disk adjacent said recording head, said turntable being rotatable about a first axis;

a support for supporting one of said turntable and said recording head so as to enable relative movement between said first axis and said recording head, said support including a rotary air bearing, and said rotary air bearing defining a direction for said relative movement; and rotary movement damping means for damping said relative movement;

said damping means comprising a container including a fixed damping element including at least one fixed vane and a moving damping element, including at least one moving vane, disposed in closely spaced relation to said at least one fixed vane so as to define a gap therebetween, and a viscous fluid filling said gap.

2. A disk recording system as claimed in claim 1 wherein said relative movement comprises rotational movement about a second axis, and wherein said fixed and moving vanes are disposed in planes extending substantially perpendicularly to said second axis.

3. A disk recording system as claimed in claim 1 wherein said relative movement comprises rotational movement about a second axis, and wherein said fixed and moving vanes comprise substantially cylindrical members substantially concentric with said second axis.

4. A disk recording system comprising:

a recording head;

a turntable for rotatably supporting a disk adjacent said recording head, said turntable being rotatable about a first axis;

a support for supporting one of said turntable and said recording head so as to enable relative movement between said first axis and said recording head, said support including an air bearing, and said air bearing defining a direction for said relative movement; and damping means for damping said relative movement, said damping means comprising a movable damping element, a fixed damping element disposed closely adjacent to said movable damping element so as to define a gap therebetween, and a highly viscous fluid in said gap, said fixed damping element including at least one fixed vane, and said movable damping element includes at least one movable vane disposed in closely spaced relation to said at least one fixed vane so as to define said gap.

5. A disk recording system as claimed in claim 4 wherein said relative movement is movement with respect to a second axis and wherein said fixed and moving vanes are disposed in planes extending substantially orthogonally to said second axis.

6. A disk recording system as claimed in claim 4 wherein said relative movement is movement with respect to a second axis and wherein said fixed and moving vanes comprise substantially cylinder members substantially concentric with said second axis.

7. A disk recording system as claimed in claim 4 wherein said damping means comprises a rotary damper for damping relative rotary movement between said turntable and said recording head.

* * * * *